Feb. 7, 1961 G. E. KELLY ET AL 2,971,050

FREQUENCY CONTROL AND COLOR KILLER FOR TELEVISION

Filed Feb. 3, 1958 2 Sheets-Sheet 1

INVENTORS
GORDON E. KELLY &
WILLIAM P. IANNUZZI
BY
[signature]
ATTORNEY

INVENTORS
GORDON E. KELLY &
WILLIAM P. IANNUZZI
BY
ATTORNEY

United States Patent Office
2,971,050
Patented Feb. 7, 1961

2,971,050

FREQUENCY CONTROL AND COLOR KILLER FOR TELEVISION

Gordon E. Kelly and William P. Iannuzzi, Haddonfield, N.J., assignors to Radio Corporation of America, a corporation of Delaware Filed Feb. 3, 1958, Ser. No. 713,042

6 Claims. (Cl. 178—5.4)

This invention relates to color television receivers, and more particularly to phase detector systems for comparing the received color subcarrier bursts with the output of the local color subcarrier oscillator to develop (1) an automatic phase and frequency control signal for controlling the local subcarrier oscillator, (2) a color killer actuating voltage for acting through a color killer circuit to disable the chrominance channel during reception of monochrome signal transmissions, and (3) an automatic chroma control signal for controlling the gain of the chrominance channel during reception of color signal transmissions.

Color television broadcasting in accordance with standards established in the United States involves the transmission during horizontal retrace time of a burst of color subcarrier oscillations following each horizontal deflection synchronizing pulse. Color television receivers include a source of burst-synchronized local color subcarrier oscillations which are applied to color demodulators. The demodulators extract the color information from the received video signal existing during trace time. It is essential that the local color subcarrier oscillations be in synchronism and in a predetermined phase relation with the received bursts. This may be accomplished by means of a phase detector which compares the bursts with an output of a local oscillator and develops an automatic phase and frequency control (APFC) voltage for application to a reactance tube coupled to the oscillator. It is also important to develop a color killer (CK) voltage for disabling the chrominance or chroma channel of the television receiver during reception of monochrome transmissions. Additionally, it is desirable to generate an automatic chroma control (ACC) voltage to automatically control the gain of the chrominance or chroma channel during color transmissions in accordance with the amplitude of the color subcarrier bursts.

Color television receivers commonly include a balanced phase detector including two rectifiers. In such circuits the color subcarrier oscillator and the color subcarrier bursts are applied in phase quadrature across respective ones of the rectifiers. An APFC voltage is derived from the balanced arrangement for application to a reactance tube which controls the frequency and phase of the local oscillator. A color killer control voltage which is proportional to the amplitude of the burst is derived in an unbalanced manner from the circuit elements associated with one of the rectifiers which effectively operates as a peak detector to indicate the presence or absence of the color subcarrier bursts. This arrangement is relatively noise immune so far as the APFC voltage is concerned, but is not noise immune so far as the color killer control voltage is concerned, since the peak detector cannot distinguish between noise and burst, or between a nonsynchronous relation of the burst and color subcarrier oscillator signals.

It is known to employ two balanced phase detectors both responsive to the received bursts and an output of the local oscillator. An APFC voltage is obtained from one of the balanced phase detectors, and a color killer control voltage is obtained from the other balanced phase detector. This arrangement requires at least four rectifiers and a sufficient number of circuit components to complete two separate balanced phase detectors.

It is a general object of this invention to provide an improved phase detector system requiring only three rectifiers and correspondingly fewer circuit components providing both APFC and color killer control output voltages which are substantially noise immune, and wherein the color killer control output voltage is comparable to that in a system using four rectifiers.

It is another object of the invention to provide an improved phase detector system for use in a color television receiver to provide APFC, color killer control and automatic chroma control output voltages.

It is a further object of this invention to provide a color television receiving system including a circuit for providing an APFC voltage, and providing an improved color killing control action as compared to circuits of similar complexity.

It is a still further object of this invention to provide an improved phase detector system of simplified construction for use in a color television receiver, which provides an APFC voltage and which also provides a negative (or positive) color killer control voltage when the bursts and oscillations are in synchronism, but which provides substantially zero voltage when bursts are absent or when the bursts and local oscillations are out of synchronism.

A combination automatic phase and frequency control and color killer control circuit constructed according to the teachings of this invention includes three rectifiers. A source of received color subcarrier bursts and a source of local color subcarrier oscillations are applied to the three diodes. The output of one of these sources is applied in three different phases across respective ones of the three rectifiers. The output of the other source is applied in two different phases across the three rectifiers. Two of the rectifiers are connected to provide an APFC voltage. The phase difference between the burst and subcarrier oscillations applied to these two rectifiers is selected to be greater than 90° when the local subcarrier oscillator is in synchronism with the bursts. One of these rectifiers together with the third rectifier is connected to provide a color killer control voltage, and when the subcarrier oscillator is properly synchronized, the burst and subcarrier oscillations are preferably in phase across the third rectifier.

These and other objects and aspects of the invention are described in greater detail in conjunction with the appended drawings, wherein.

Figure 1:
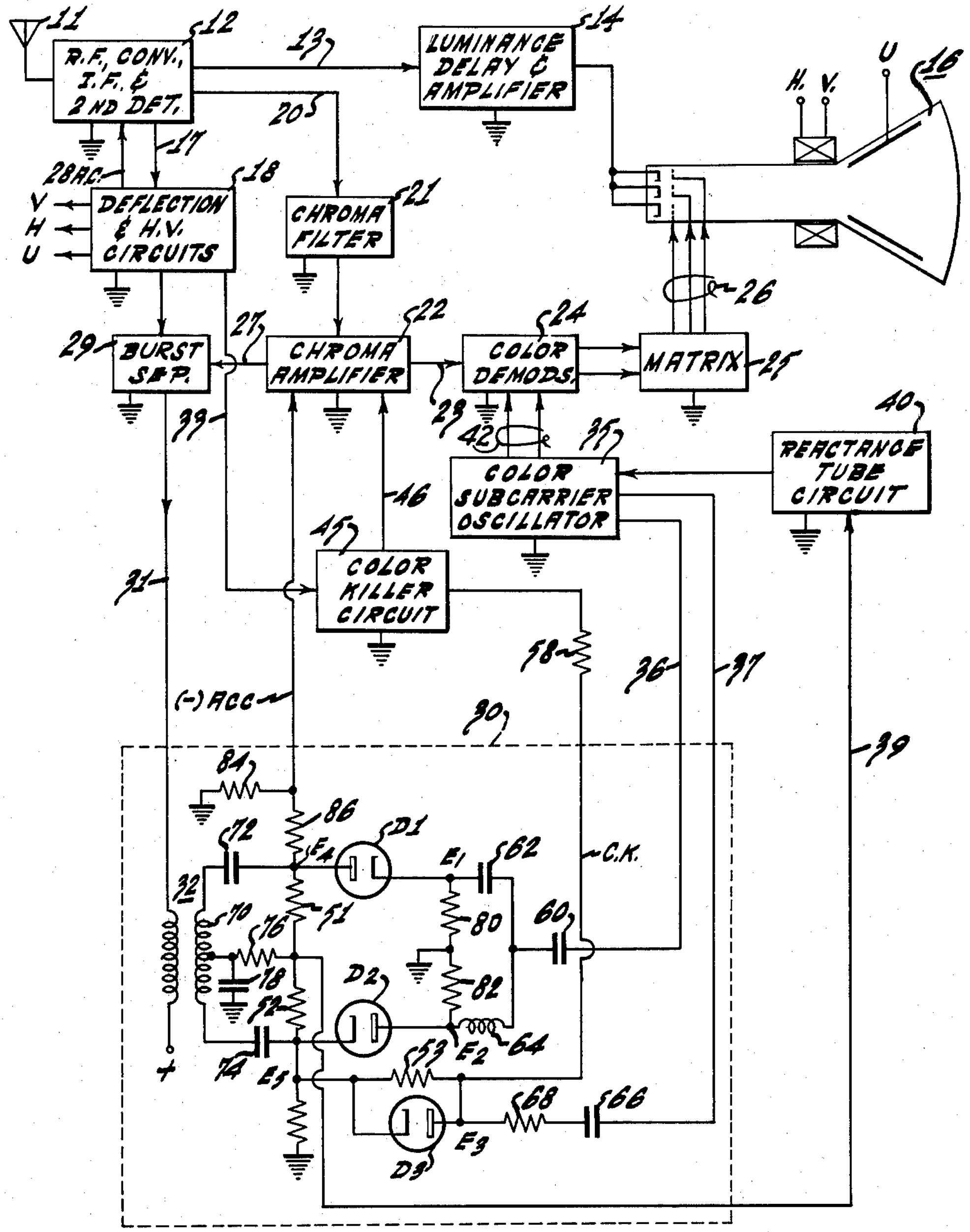
Figure 1 is a schematic circuit diagram partly in block form of a color television receiver including one form of the phase detector system of the present invention.

Reference will now be made to Figure 1 for a description of a color television receiver including a phase detector system according to this invention. A television signal intercepted by an antenna 11 is applied to a television signal receiver 12 including a radio frequency amplifier, a frequency converter, an intermediate frequency amplifier and a second detector. The second detector provides a demodulated television signal which includes luminance or brightness components and synchronizing components when a monochrome television signal is received, and in addition to these components, a chrominance component and a color subcarrier burst component when a color television signal is received.

The received television signal also includes a sound modulated carrier signal having a frequency displaced 4.5 megacycles from the picture carrier. The sound carrier is heterodyned with the picture carrier in intermediate frequency amplifier to produce a 4.5 mc. beat signal at the output terminal of the second detector as is conventional in intercarrier television receivers. The 4.5 mc. sound signal from the receiver 12 is applied in the usual manner to an audio detector and amplifier (not shown) which are connected to drive a loudspeaker (not shown) for the purpose of reproducing the audio portion of a received television signal.

The demodulated output signal from the receiver 12 is applied by way of a conductor 13 to a luminance signal delay and amplifying means 14 which in turn applies the amplified and delayed luminance signal to the cathodes of a color kinescope 16. The output signal from the receiver 12 is also applied through a conductor 17 to the deflection and high voltage circuits 18 wherein the synchronizing pulse components of the composite television signal are used to synchronize the line and field scanning rates of the receiver with those of the transmitted signal. The horizontal and vertical scanning signals H and V respectively, together with an ultor voltage U which is developed in the circuits 18, are applied to correspondingly designated terminals associated with the color kinescope 16 and adjuncts therefor.

The synchronizing pulse components are also used to develop an automatic gain control potential which is applied to the R.F. and I.F. amplifiers through the lead 28 to maintain a constant signal output level at the second detector.

Another output signal from the receiver 12 appearing between the conductor 20 and ground is applied through a chroma filter 21 to a chroma amplifier 22. The chroma filter 21 selects the chrominance signal components, and the amplified chrominance signal output from the chroma amplifier 22 is applied via the conductor 23 to the color demodulators 24. Demodulated signal outputs from the demodulators 24 are in turn applied to a matrix 25 from which three color difference signal outputs are derived and applied by way of the conductors 26 to respective ones of the three control grids in the kinescope 16.

The signal output from the chroma amplifier 22 is also applied through the conductor 27 to a burst separator stage 29 which is keyed by a flyback pulse from the circuits 18 to separate the color subcarrier bursts from the chrominance signal. The burst output from the burst separator 29 is applied to a phase detector system 30 by means of a conductor 31 and a transformer 32. The phase detector system 30 is also connected to receive signals from a color subcarrier reference oscillator 35 through the conductors 36 and 37. The phase detector system operates to compare the phase relationship between the burst and oscillator signals, and to produce a resultant output potential indicative of the extent and sense in which the oscillator signal departs from a predetermined phase relation. The automatic phase and frequency control (APFC) signal output potential from the detector system 30 is applied through lead 39 to a reactance tube circuit 40. The APFC signal acts through the reactance tube circuit 40 to maintain the color subcarrier oscillator 35 in synchronism and in predetermined phase with the received bursts. Two output signals from the oscillator 35 which have phases corresponding with the desired phases of demodulation are coupled by conductors 42 to the color demodulators 24 to derive the color difference signals referred to above.

A negative direct-current color killer control voltage output, designated CK, from the phase detector system 30 is applied to a color killer circuit 45 having an output circuit which is connected by lead 46 to the chroma amplifier 22. A flyback pulse from circuits 18 is applied over a lead 33 to the color killer circuit 45. The output signal of the color killer circuit 45 deactivates the chroma amplifier 22 during trace time when monochrome transmissions are being received. An automatic chroma control output signal, on lead designated ACC, is applied to the chroma amplifier 22 to automatically control the gain of the amplifier during receipt of color signal transmissions in accordance with the amplitude of the received burst signals.

The phase detector system 30 includes three rectifiers designated D1, D2 and D3. A load impedance such as the resistor 51 is associated with rectifier D1; a load impedance or resistor 52 is associated with diode D2; and a load impedance or resistor 53 is associated with rectifier D3.

In accordance with the invention, signals from the local color subcarrier oscillator are applied in three different phases E1, E2 and E3 across the respective rectifiers D1, D2 and D3. The color subcarrier burst which is developed across the secondary winding 70 of the transformer 32 is applied in one phase E4 across the rectifier D1 and in the opposite phase E5 across the rectifiers D2 and D3. When the oscillator 35 is synchronized, the phase difference between the two signals E1, E4 and E2, E5 applied to the rectifiers D1 and D2 respectively which provide the APFC voltage, is selected to be greater than 90° (quadrature), as opposed to the quadrature relation heretofore used in conventional phase detectors.

Further in accordance with the invention, the signals E3 and E5 applied to the rectifier D3 are preferably in phase. The resultant potential appearing across one of the rectifier D1 or D2 load resistors is subtractively combined with the resultant potential across the rectifier D3 load resistor. Since the phase relation of the signals across either of the phase detector rectifiers D1 or D2 is greater than 90°, the resultant potential across either load resistor 51 or 52 is less than it would have been if a quadrature relation existed. Thus, when this smaller potential is subtracted from the potential across the load resistor 53 for the rectifier D3 a correspondingly larger color killer control voltage is provided. It should be understood that in the nonsynchronous relation of the various signals, or in the absence of the burst signal, the respective rectifiers act as peak detectors, and the potential across all of the resistors 51, 52 and 53 will be equal. Therefore if the potential across the resistor 53 is subtractively combined with the potential across either of the load resistors 51 or 52, the net color killer voltage would be zero. A zero output voltage conditions the color killer 45 to block the chroma amplifier 22.

In Figure 1, the phases of the oscillator signal on the leads 36 and 37 are in quadrature or 90° apart. The oscillator signal appearing on the lead 36 is applied through a blocking capacitor 60 and a phase shifting capacitor 62 to the cathode of the rectifier D1. This signal is also applied through the blocking capacitor 60 having a phase shifting inductor 64 to the anode of the rectifier D2. The effect of the phase shifting elements 62 and 64 is opposite so that the resulting oscillator signal as applied to the rectifiers D1 and D2, for example, shifted about 45° in opposite directions from the signal appearing on the lead 36. Thus, the phases E1 and E2 are 90° apart. The specific phase relation of these signals is shown more clearly in Figures 2A and 2B. The signal appearing on the lead 37 is applied to a blocking capacitor 66 and a resistor 68 to the anode of the rectifier D3, and will be about 45° displaced from the phase E1, and about 135° from the phase E2.

The color subcarrier burst signal which is developed across the secondary winding 70 of the transformer 32 provides two phases E4 and E5 which are 180° apart and which appear at opposite ends of the secondary winding 70. The phase E4 of this signal is applied to the anode of the rectifier D1 through a capacitor 72, and the phase E5 of this signal is applied to the cathode of the rectifier D2 through a capacitor 74. The phase E5 is also applied to the cathode of the rectifier D3 which is directly connected to the cathode of the rectifier D2.

When the oscillator is synchronized, the phase difference between E1 and E4 and between E2 and E5 will be 135°. It will be understood that the specific phase shift of 45° from quadrature for the signals across the phase detector rectifiers are described to facilitate an understanding of this invention, and should not be construed as limiting. The specific phase shift of 45°, however, as applied to commercial apparatus was found to provide a substantially enhanced color killer control voltage as compared to circuits of similar complexity without substantial degradation of the phase detector operation.

The center tap of the secondary winding 70 is effectively grounded for signal frequencies by a bypass capacitor 78, and is D.C. connected through a resistor 76 to the junction of the load resistors 51 and 52 for the rectifiers D1 and D2.

The D.C. paths for the rectifiers D1 and D2 are completed through the resistors 80 and 82 respectively and through ground back through a pair of resistors 84 and 86 across which an automatic chroma control voltage is derived, the magnitude of which is a function of the amplitude of the color subcarrier burst.

Figure 2A:
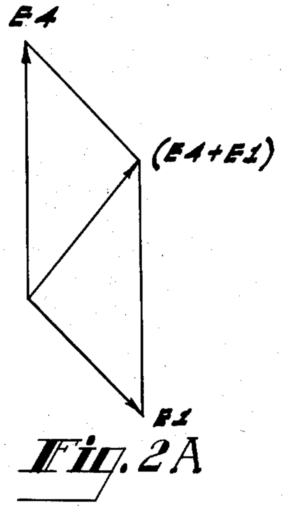
Figures 2A and 2B are vector diagrams which will be referred to in describing the operation of the system of the invention.
Figure 2B:
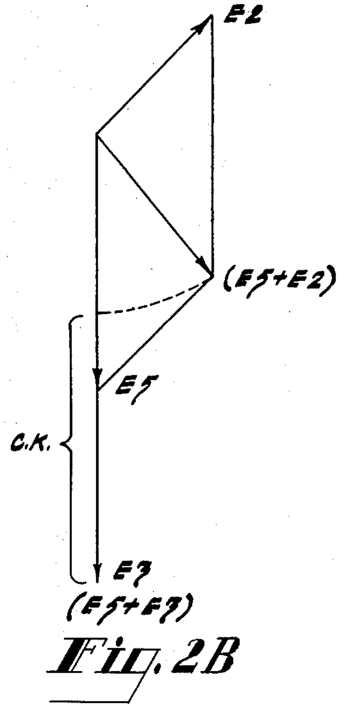
Figure 3A:
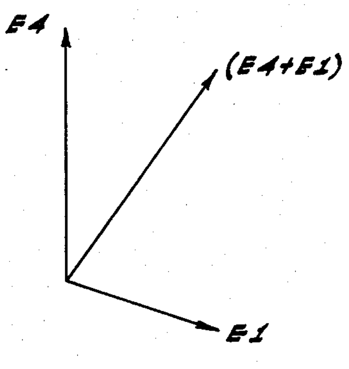
Figures 3A and 3B are other vector diagrams similar to those of Figures 2A and 2B but illustrating a different operating condition of the circuit of the invention.
Figure 3B:
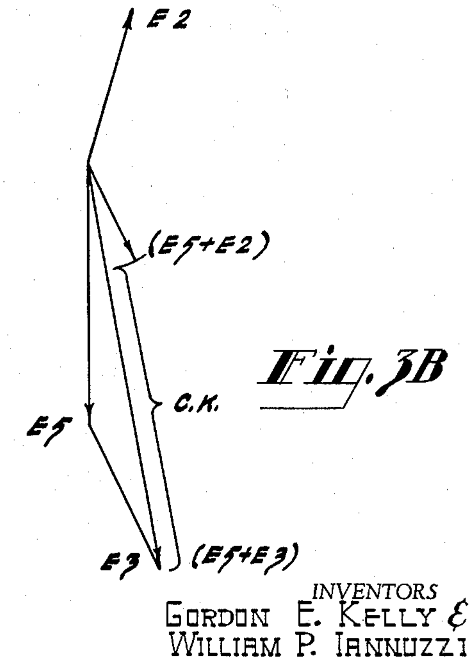

The automatic phase and frequency control loop including the phase detector system 30, the color subcarrier oscillator 35 and the reactance tube 40 are initially set up so that when the oscillator 35 is in synchronism with, and in desired phase with, the received bursts, the APFC voltage is zero. More specifically, in synchronism the oscillator phases E1 and E2 are about 135° displaced with respect to the burst phases E4 and E5 respectively. Under this condition, the signal phases E1, E2, E3, E4 and E5 are as illustrated in Figures 2A and 2B. If the phase of the oscillator 35 drifts away from the desired locked-in phase, the vector relationships may be as shown in Figures 3A and 3B. In this case, an APFC voltage is generated which, when applied to the reactance tube circuit 40, tends to return the oscillator phase to the desired locked-in value. If the local oscillations and the bursts are out-of-synchronism, the vector relationships shown in Figures 2 and 3 no longer exist and are replaced by a random and continuously varying phase relationship. In this case, there is no direct current APFC voltage. However, there is an alternating current APFC voltage which tends to bring the frequency of the oscillator into synchronism with the bursts. When the synchronism is established, the phase relationships are the same as or similar to those shown in Figures 2 and 3, and a direct current APFC voltage is developed which tends to maintain the oscillator in the desired phase relationship with the bursts.

Referring to Figures 1, 2 and 3, the radio frequency burst signal at phase E4 is applied to the anode of rectifier D1 and the radio frequency local oscillator signal at phase E1 is applied to the cathode of rectifier D1. Because of the phase relation of E4 and E1, the peak voltage across the rectifier D1 load resistor 51 is represented by the vector (E4 and E1) in Figures 2 and 3. The parentheses are intended to designate the magnitude only of the vector sum of the peak R.F. voltages of E4 and E1. Similarly, the R.F. voltages E5 and E2 across diode D2 load resistor 52 result in a D.C. voltage $(E5+E2)$. The voltages $(E4+E1)$ and $(E5+E2)$ are combined by load resistors 51 and 52 to provide an APFC voltage at the junction point therebetween equal to $$\frac{(E4+E1)-(E5+E2)}{2}$$

The APFC voltage is half the difference between the two voltages $(E4+E1)$ and $(E5+E2)$ because of the voltage dividing action of the two equal resistors 51 and 52. The polarities of the diodes D1 and D2 are made such that the APFC voltage is proportional to the difference between the voltages $(E4+E1)$ and $(E5+E2)$. The vector diagrams, being intended for general illustration, do not reflect the ½ factor.

As described above, in addition to the oscillator R.F. phase applied to the anode of rectifier D3, the burst R.F. phase E5 is applied through the capacitor 74 to the cathode of rectifier D3. These two R.F. signals tend to cause the rectifier load resistor 53 to develop a D.C. voltage equal to the vector sum $(E5+E3)$. But, the D.C. voltage $(E5+E2)$ at the cathode of rectifier D2 is also applied to the cathode of rectifier D3. This voltage is algebraically combined with the voltage $(E5+E3)$ to produce a net voltage at the anode of the rectifier D3 of a value equal to $(E4+E1)-(E4+E3)$. This is the color killer (CK) control voltage, indicated in Figures 2 and 3, which is applied through an isolating resistor 58 to the color killer circuit 45. The CK voltage derived by this arrangement, is not subject to the ½ factor mentioned above.

In Figures 2 and 3, dotted line arcs are struck to graphically illustrate how the APFC and CK voltages are obtained by subtraction of one D.C. magnitude from another. It will be noted that so long as the local oscillator remains in frequency synchronism with the bursts, the D.C. APFC voltage can have a value in a range between plus and minus values depending on the phase relationship of the two R.F. signals, and the CK voltage always has a value of one polarity. But, when the two R.F. signals are out of synchronism (i.e., have a random phase relationship), or the burst is absent, the D.C. APFC and CK voltages are zero. Thus, the CK voltage acts to disable the chroma channel only when the oscillator is not in frequency synchronism with the bursts. This general statement also covers the special case where bursts are absent. Thus, noise pulses which are of a random nature do not cause an output signal to be produced which would activate the chroma amplifier 22. The CK voltage is ideal for its functional purpose, i.e., to disable the chroma channel only when it is impossible to reproduce a color picture. This is in contrast to prior art arrangements wherein the CK voltage is solely a function of burst amplitude and must be related to a predetermined threshold level.

The phase discriminator system 30 may be arranged to provide a negative or a positive CK voltage. A negative CK voltage is obtained by the arrangement shown in Figure 1. The choice of CK polarity in a specific application depends, of course, on the nature of the color killer circuit 45 and the manner in which the output of the circuit 45 is used to control the chroma amplifier 22. In any case, when the CK output from the discriminator 30 is zero, the chroma amplifier 22 is deactivated during trace time, and when the CK output from the discriminator 30 is a negative (or positive) voltage, the chroma amplifier is allowed to remain active.

While Figure 1 shows the burst applied in two phases E4 and E5 to the system 30, and the oscillator output applied in the three phases E1, E2 and E3 to the system 30, it will be understood that the burst and oscillator inputs may be transposed.

In Figure 1, the negative D.C. voltage $(E4+E1)$ existing across the rectifier D1 load resistor 51 may be employed as an automatic chroma control voltage. To this end a pair of resistors 84 and 86 are connected between the anode of the rectifier D1 and ground. The voltage appearing at the junction of these resistors is applied to control the gain of the chroma and burst amplifier 22. The ACC voltage is roughly proportional to the amplitude of the bursts E4, since the rectifier D1 may be considered to be a peak detector for the burst signal. The degree to which the ACC voltage approximates the burst amplitude depends on the amplitude of the bursts E4 compared with the amplitude of the oscillator signal E1. By proper choice of relative amplitudes, the ACC voltage can be made substantially proportional to bursts. If desired, it is also possible to use the CK voltage for ACC purposes, since this voltage is also proportional to burst amplifier as a study of the vector diagrams will show.

What is claimed is:

1. In a color television receiver, a combination automatic phase and frequency control and color killer control circuit, comprising, means for providing a source of received color subcarrier bursts, means for providing a source of local color subcarrier oscillations, first, second and third rectifiers, means coupled to one of said sources for applying signals in first, second and third different phases across respective ones of said three rectifiers, means coupled to the other of said sources for applying signals across all of said rectifiers so that the phase difference between the signals applied to said first and second rectifiers from said sources is greater than 90° when said source of oscillations is in synchronism with said bursts, means connected to said first and second rectifiers for providing an automatic phase and frequency control voltage, and means connected to said first and third rectifiers for providing a color killer control voltage.

2. In a color television receiver, a combination automatic phase and frequency control and color killer control circuit, comprising, means for providing a first source of received color subcarrier bursts, means for providing a second source of local color subcarrier oscillations, means for controlling the frequency of oscillation of said second source in response to a control signal, first, second and third rectifiers, means coupled to one of said sources for applying signals to all of said rectifiers, means coupled to the other of said sources for applying signals in first, second and third different phases across respective ones of said three rectifiers so that the phase difference between the signals applied across said first and second rectifiers is greater than 90° when said source of oscillations is in the proper phase relation with said bursts, means connected to said first and second rectifiers for providing an automatic phase and frequency control voltage, means to couple said control voltage to said means for controlling the frequency of oscillation of said second source, and means connected to said first and third rectifiers for providing a color killer control voltage.

3. In a color television receiver having a chroma signal channel, a combination automatic phase and frequency control and color killer control circuit, comprising, means for providing a source of received color subcarrier bursts, means for providing a source of local color subcarrier oscillations, means for controlling the frequency of oscillation of said second source in response to a control signal, first, second and third rectifiers, means coupled to one of said sources for applying signals in first, second and third different phase across respective ones of said three rectifiers, means coupled to the other of said sources for applying signals in one phase across said first rectifier and in a second phase across said second and third rectifiers so that the phase difference between the signals across said first and second rectifiers is greater than 90° when said source of oscillations is synchronous and in predetermined phase relation with said bursts, means connected to said first and second rectifiers for providing an automatic phase and frequency control voltage, means coupled to said means for controlling the frequency of oscillation of said source of oscillations for applying said control voltage to said means for controlling the frequency of oscillation of said source of oscillations, means connected to said first and third rectifiers for providing a color killer control voltage, and means coupled to said color killer control voltage providing means and to said chroma channel for selectively disabling said channel.

4. In a color television receiver, a combination automatic phase and frequency control and color killer control circuit, comprising, means for providing a source of received color subcarrier bursts, means for providing a source of local color subcarrier oscillations, first, second and third rectifiers, means coupled to one of said sources for applying signals in first, second and third different phases across respective ones of said three rectifiers so that said first and second phases are each greater than 90° and less than 180 degrees out of phase with said third phase, means coupled to the other of said sources for applying signals in one phase across said first rectifier and in an opposite phase across said second and third rectifiers, load impedances coupled with said rectifiers, means for algebraically combining the voltages across the load impedances coupled wiih said first and second rectifiers to provide an automatic phase and frequency control voltage, and means for algebraically combining the voltages across the load impedance coupled with said first and third rectifiers for providing a color killer control voltage.

5. In a television receiver adapted to receive either a composite color signal including a chrominance signal component and a color synchronizing burst component or a monochrome signal lacking said color synchronizing burst, the combination including: signal receiving means for receiving either said monochrome signal or said composite color signal; means including image reproducing apparatus and associated signal processing circuits for reproducing an image, said signal processing circuits being coupled to said signal receiving means and operable in response to a control signal of a first magnitude to be conditioned to process composite color television signals but operable in response to a second magnitude of said control signal to be conditioned to process only monochrome television signals; means for providing a source of local color subcarrier oscillations; means coupled to said source and to said signal processing circuits for demodulating said chrominance signal components; a control circuit including first, second and third rectifiers; means for applying different phases of said color synchronizing bursts and said color subcarrier oscillations across said first and second rectifiers so that the phase difference between the signals across either of said rectifiers is greater than 90° when said source of color subcarrier oscillations is synchronous and in predetermined phase relation with said bursts; means connected to said first and second rectifiers for providing an automatic phase and frequency control voltage; means responsive to said automatic phase and frequency control voltage for controlling the frequency of oscillation of said source of oscillations; means for applying said color synchronizing bursts and said color subcarrier oscillations across said third rectifier, means connected to said first and third rectifiers for providing a control voltage of said first magnitude when said color subcarrier oscillations are in predetermined synchronous relation with said color synchronizing burst and of a second magnitude when said color subcarrier oscillations are not synchronous with said color synchronizing bursts; and means for applying said control voltage to said signal processing circuits.

6. In a television receiver adapted to receive either a composite color signal including a chrominance signal component and a color synchronizing burst component or a monochrome signal lacking said color synchronizing burst, the combination including: signal receiving means for receiving either said monochrome signal or said composite color signal; means including image reproducing apparatus and associated signal processing circuits for reproducing an image, said signal processing circuits being coupled to said signal receiving means and operable in response to a control signal of a first magnitude to be conditioned to process composite color television signals but operable in response to a second magnitude of said control signal to be conditioned to process only monochrome television signals; means for providing a source of local color subcarrier oscillations coupled with said signal processing circuits for demodulating said chrominance signal components; a control circuit including first, second and third rectifiers; means for applying signals from said source of color subcarrier oscillations in first, second and third different phases across respective ones of said three rectifiers, said first and second phases being in quadrature;

means for applying said color synchronizing bursts across said first rectifier in one phase and in an opposite phase across said second and third rectifiers so that the phase difference between the color subcarrier oscillations and color synchronizing bursts across either of said first and second rectifiers is substantially 135° and the color synchronizing bursts and color subcarrier oscillations are in phase across said third rectifier when said source of said color subcarrier oscillations in synchronous with and in predetermined phase relation to said bursts; load resistors connected with each of said rectifiers; means for algebraically combining the voltages developed across the load resistors associated with said first and second rectifiers to provide an automatic phase and frequency control voltage, the sense and magnitude of which indicate the extent and direction of phase departure of said color subcarrier oscillations from said predetermined phase relation; means for controlling the frequency of oscillation of said source of oscillations; means for impressing said automatic phase and frequency control voltage upon said frequency controlling means; means for algebraically combining the voltages across the load resistors associated with said first and third rectifiers to provide a control voltage of said first magnitude when said color subcarrier oscillations are in synchronous relation with said color synchronizing bursts and of a second magnitude when said color subcarrier oscillations are non-synchronous with said color synchronizing bursts; and means for applying said control voltage to said signal processing circuits.

References Cited in the file of this patent

UNITED STATES PATENTS 2,813,147 Richman ---------------- Nov. 12, 1957